(12) United States Patent
Tiwari et al.

(10) Patent No.: US 11,924,679 B2
(45) Date of Patent: Mar. 5, 2024

(54) DISTINGUISHING BETWEEN GENERAL NAS LEVEL CONGESTION AND S-NSSAI RELATED CONGESTION CONTROL

(71) Applicant: NEC Corporation, Tokyo (JP)

(72) Inventors: Kundan Tiwari, Tamil Nadu (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/692,430

(22) Filed: Mar. 11, 2022

(65) Prior Publication Data

US 2022/0201550 A1 Jun. 23, 2022

Related U.S. Application Data

(63) Continuation of application No. 16/322,637, filed as application No. PCT/JP2019/000341 on Jan. 9, 2019, now Pat. No. 11,317,318.

(30) Foreign Application Priority Data

Feb. 16, 2018 (IN) .............................. 201811006021

(51) Int. Cl.
*H04W 28/02* (2009.01)
*H04W 48/06* (2009.01)
*H04W 76/38* (2018.01)

(52) U.S. Cl.
CPC ... *H04W 28/0289* (2013.01); *H04W 28/0247* (2013.01); *H04W 48/06* (2013.01); *H04W 76/38* (2018.02)

(58) Field of Classification Search
CPC . H04W 28/0284; H04W 28/08; H04W 48/06; H04W 48/18; H04W 76/38
See application file for complete search history.

(56) References Cited

U.S. PATENT DOCUMENTS

| | | | |
|---|---|---|---|
| 9,107,129 B2 | 8/2015 | Serravalle | H04B 7/2606 |
| 9,226,256 B2 | 12/2015 | Velev | H04W 66/00 |
| 9,560,569 B2 | 1/2017 | Serravalle | H04W 28/08 |
| 9,877,198 B1* | 1/2018 | Liu | H04W 12/06 |

(Continued)

FOREIGN PATENT DOCUMENTS

| | | | | |
|---|---|---|---|---|
| AU | 2018289655 A1 | 2/2020 | | H04W 76/18 |
| AU | 2018289916 A1 | 2/2020 | | H04W 76/12 |

(Continued)

OTHER PUBLICATIONS

Han et al., Admission and Congestion Control for 5G Network Slicing, Oct. 29, 2018, 2018 IEEE Conference on Standards for Communications and Networking (CSCN), Paris, France, pp. 1-6, doi: 10.1109/CSCN.2018.8581773 (Year: 2018).*

(Continued)

*Primary Examiner* — Eric Nowlin

(57) ABSTRACT

A RAN node includes means for receiving a N2 message containing a list of S-NSSAI of the congested network slice from an AMF and means for sending the list of S-NSSAI and a wait timer for each S-NSSAI in the list in first AN signaling message to an UE when receiving, from the UE, second signaling message containing the list of S-NSSAI to establish an AN signaling connection, the S-NSSAI being indicated in the N2 message as congested by the AMF.

2 Claims, 10 Drawing Sheets

(56) References Cited

U.S. PATENT DOCUMENTS

| | | | | |
|---|---|---|---|---|
| 9,961,624 | B1* | 5/2018 | Zait | H04L 47/78 |
| 10,264,506 | B2 | 4/2019 | Faccin | H04W 36/14 |
| 10,383,016 | B2* | 8/2019 | Kiss | H04L 45/745 |
| 10,440,642 | B2 | 10/2019 | Zait | H04W 8/20 |
| 10,499,276 | B2 | 12/2019 | Chan | H04W 28/0289 |
| 10,506,489 | B2 | 12/2019 | Vrzic | H04W 36/26 |
| 10,638,415 | B2* | 4/2020 | Baek | H04W 28/088 |
| 10,645,608 | B2 | 5/2020 | Shaw | H04W 28/24 |
| 10,743,211 | B2 | 8/2020 | Panchal | H04W 8/02 |
| 10,743,250 | B2 | 8/2020 | Watfa | H04W 48/18 |
| 10,813,045 | B2 | 10/2020 | Xing | H04W 28/0221 |
| 10,932,174 | B2 | 2/2021 | Serravalle | H04W 28/08 |
| 10,952,078 | B2 | 3/2021 | Thakolsri | H04W 48/18 |
| 10,959,160 | B2 | 3/2021 | Lou | H04W 28/0268 |
| 10,980,075 | B2 | 4/2021 | Willars | H04W 76/15 |
| 10,986,562 | B2* | 4/2021 | Kim | H04W 76/18 |
| 11,064,389 | B1 | 7/2021 | Sevindik | H04W 24/08 |
| 11,122,439 | B2 | 9/2021 | Wang | H04W 88/14 |
| 11,160,007 | B2* | 10/2021 | Kim | H04W 76/27 |
| 11,343,757 | B2* | 5/2022 | Kang | H04W 76/19 |
| 11,457,403 | B2* | 9/2022 | Kim | H04W 76/18 |
| 11,632,734 | B2* | 4/2023 | Stojanovski | H04W 8/26 455/435.1 |
| 11,683,847 | B2* | 6/2023 | Salkintzis | H04W 12/041 455/411 |
| 2013/0137438 | A1 | 5/2013 | Serravalle | H04B 7/155 455/437 |
| 2014/0003348 | A1 | 1/2014 | Velev | H04W 60/06 370/328 |
| 2015/0312828 | A1 | 10/2015 | Serravalle | H04W 36/22 455/438 |
| 2017/0006514 | A1* | 1/2017 | Kiss | H04L 45/745 |
| 2017/0105159 | A1 | 4/2017 | Serravalle | H04W 36/22 |
| 2017/0142591 | A1 | 5/2017 | Vrzic | H04L 47/2408 |
| 2017/0171811 | A1 | 6/2017 | Xing | H04W 48/12 |
| 2017/0303259 | A1 | 10/2017 | Lee et al. | |
| 2018/0234915 | A1 | 8/2018 | Zait | H04W 8/20 |
| 2018/0262924 | A1 | 9/2018 | Dao | H04W 72/1257 |
| 2018/0332523 | A1* | 11/2018 | Faccin | H04W 36/14 |
| 2019/0037409 | A1 | 1/2019 | Wang | H04W 16/04 |
| 2019/0124544 | A1 | 4/2019 | Shaw | H04W 48/18 |
| 2019/0141562 | A1 | 5/2019 | Tyagi | H04W 28/0215 |
| 2019/0174536 | A1 | 6/2019 | Han | H04W 74/0833 |
| 2019/0182752 | A1 | 6/2019 | Lou | H04W 48/08 |
| 2019/0200208 | A1 | 6/2019 | Chandramouli | H04W 78/18 |
| 2019/0223093 | A1 | 7/2019 | Watfa | H04W 48/18 |
| 2019/0246334 | A1* | 8/2019 | Wang | H04W 48/16 |
| 2019/0281494 | A1 | 9/2019 | Chan | H04W 48/06 |
| 2019/0342821 | A1* | 11/2019 | Kim | H04W 48/02 |
| 2019/0349774 | A1 | 11/2019 | Lou | H04W 16/10 |
| 2019/0350035 | A1* | 11/2019 | Kim | H04W 48/06 |
| 2020/0068430 | A1 | 2/2020 | Chan | H04W 24/08 |
| 2020/0068431 | A1 | 2/2020 | Han | H04W 28/0284 |
| 2020/0100137 | A1 | 3/2020 | Panchal | H04L 47/14 |
| 2020/0107378 | A1 | 4/2020 | Velev | H04W 76/10 |
| 2020/0120547 | A1 | 4/2020 | Han | H04W 76/30 |
| 2020/0120738 | A1 | 4/2020 | Kawasaki | H04W 76/18 |
| 2020/0128601 | A1 | 4/2020 | Willars | H04W 75/15 |
| 2020/0137621 | A1 | 4/2020 | Yang | H04W 76/27 |
| 2020/0145833 | A1 | 5/2020 | Thakolsri | H04W 4/00 |
| 2020/0178076 | A1* | 6/2020 | Ben Henda | H04L 63/0869 |
| 2020/0196133 | A1 | 6/2020 | Kawasaki | H04W 28/18 |
| 2020/0196169 | A1 | 6/2020 | Dao | H04W 24/08 |
| 2020/0196382 | A1 | 6/2020 | Kawasaki | H04L 29/08 |
| 2020/0245185 | A1 | 7/2020 | Shaw | H04L 5/0064 |
| 2020/0336935 | A1 | 10/2020 | Takakura | H04W 28/0289 |
| 2020/0336937 | A1 | 10/2020 | Youn | H04W 48/16 |
| 2020/0344642 | A1 | 10/2020 | Panchal | H04W 36/14 |
| 2020/0351756 | A1 | 11/2020 | Jager | H04W 46/17 |
| 2020/0366546 | A1 | 11/2020 | Kommula | H04L 45/38 |
| 2020/0366611 | A1 | 11/2020 | Kommula | H04L 41/5009 |
| 2020/0366612 | A1 | 11/2020 | Kommula | H04L 49/25 |
| 2020/0367090 | A1 | 11/2020 | Zhang | H04W 28/0247 |
| 2020/0367149 | A1* | 11/2020 | Kang | H04W 28/0247 |
| 2020/0374793 | A1 | 11/2020 | Watfa | H04W 36/24 |
| 2021/0029628 | A1* | 1/2021 | Kim | H04W 48/18 |
| 2021/0092634 | A1 | 3/2021 | Kang | H04W 26/0247 |
| 2021/0160763 | A1 | 5/2021 | Lou | H04W 48/06 |
| 2021/0168751 | A1* | 6/2021 | Stojanovski | H04W 60/00 |
| 2021/0195673 | A1 | 6/2021 | Willars | H04W 76/16 |
| 2021/0204169 | A1 | 7/2021 | Sevindik | H04W 40/12 |
| 2021/0258864 | A1 | 8/2021 | Mazed | H04L 41/06 |
| 2021/0274464 | A1 | 9/2021 | Nord | H04W 68/005 |
| 2021/0274570 | A1 | 9/2021 | Catovic | H04W 46/18 |
| 2021/0321296 | A1 | 10/2021 | Sevindik | H04W 76/15 |
| 2021/0368347 | A1 | 11/2021 | Wang | H04W 16/04 |
| 2021/0368383 | A1* | 11/2021 | Jangid | H04W 48/06 |
| 2022/0361080 | A1* | 11/2022 | Soliman | H04W 36/0033 |

FOREIGN PATENT DOCUMENTS

| | | | | |
|---|---|---|---|---|
| CA | 3067783 | A1 | 12/2018 | H04W 28/24 |
| CN | 108810973 | A | 11/2018 | H04W 28/0289 |
| CN | 109267769 | A | 1/2019 | H04W 36/00 |
| CN | 110754114 | A | 2/2020 | H04W 28/24 |
| CN | 110915293 | A | 3/2020 | H04W 28/06 |
| CN | 110946900 | A | 3/2020 | H04W 28/24 |
| CN | 111434143 | A | 7/2020 | H04W 48/06 |
| CN | 112514446 | A | 3/2021 | H04W 8/02 |
| CN | 115314961 | A * | 11/2022 | |
| EP | 3611960 | A1 | 2/2020 | H04W 76/19 |
| EP | 3611960 | A4 | 3/2020 | H04W 28/085 |
| EP | 3644648 | A1 | 4/2020 | H04W 69/322 |
| EP | 3644685 | A1 | 4/2020 | H04W 28/05 |
| EP | 3844847 | A1 | 4/2020 | H04W 76/36 |
| EP | 3654692 | A1 | 5/2020 | H04W 28/02 |
| EP | 3654692 | A4 | 5/2020 | H04W 28/04 |
| EP | 3844847 | A4 | 5/2020 | H04W 76/16 |
| EP | 363678 | A1 | 7/2020 | H04W 28/0289 |
| EP | 3552414 | B1 * | 6/2021 | H04W 16/14 |
| EP | 3673678 | A4 | 6/2021 | H04W 48/06 |
| EP | 3834467 | A1 | 6/2021 | H04W 68/005 |
| EP | 4087319 | A1 * | 11/2022 | |
| JP | 6698587 | B2 | 5/2020 | H04W 28/18 |
| JP | 2021180523 | A * | 11/2021 | |
| JP | 2022173146 | A * | 11/2022 | |
| JP | 7192928 | B2 * | 12/2022 | |
| JP | 2023022284 | A * | 2/2023 | |
| KR | 20200017502 | A | 2/2020 | H04W 28/18 |
| KR | 20200056407 | A | 5/2020 | H04W 28/0289 |
| KR | 20220151565 | A * | 11/2022 | |
| WO | WO-2018235792 | A1 | 12/2016 | H04W 75/38 |
| WO | WO-2018065052 | A1 * | 4/2018 | H04L 63/166 |
| WO | WO-2018202122 | A1 | 11/2018 | H04W 48/18 |
| WO | WO-2018235793 | A1 | 12/2018 | H04L 69/322 |
| WO | WO-2018235795 | A1 | 12/2018 | H04W 28/06 |
| WO | WO-2019011190 | A1 | 1/2019 | H04W 28/02 |
| WO | WO-2019074347 | A1 | 4/2019 | H04W 28/0289 |
| WO | WO-2019135560 | A1 | 7/2019 | H04W 76/18 |
| WO | WO-2019159567 | A1 | 8/2019 | H04W 76/38 |
| WO | WO-2019193764 | A1 | 10/2019 | H04W 48/06 |
| WO | WO-2020033174 | A1 | 2/2020 | H04W 48/06 |
| WO | WO-2020117796 | A1 * | 6/2020 | H04W 12/06 |
| WO | WO-2020165864 | A1 | 6/2020 | H04L 67/14 |
| WO | WO-2023278414 | A1 * | 1/2023 | |

OTHER PUBLICATIONS

3GPP TS 23.501, Dec. 2017, 3rd Generation Partnership Project; Technical Specification Group Services and System Aspects; System Architecture for the 5G System; Stage 2 (Release 15); Version 15.0.0 (Year: 2017).*

3GPP, Technical Specification (TS) 33.899, Technical Specification Group Services and System Aspects; Study on the security aspects of the next generation system; Aug. 2017; 3GPP; Version 1.3.0; Release 14 (Year: 2017).*

3GPP, Technical Specification (TS) 23.502, Technical Specification Group Services and System Aspects, Procedures for the 5G System, Stage 2, Dec. 2017, 3GPP, Version 2.0.0, Release 15 (Year: 2017).*

International Search Report dated Oct. 24, 2017, in corresponding PCT International Application.

(56) References Cited

OTHER PUBLICATIONS

3GPP TS23.501 V15.0.0 (Dec. 2017), "3rd Generation Partnership Project; Technical Specification Group Services and System Aspects; System Architecture for the 5G System; Stage 2, (Release 15)", pp. 1-181, (Dec. 2017).
3GPP TS38.300 V15.0.0 (Dec. 2017), "3rd Generation Partnership Project; Technical Specification Group Radio Access Network; NR; NR and NG-RAN Overall Description; Stage 2, (Release 15)", pp. 1-68, (Dec. 2017).
3GPP TS38.413 V0.6.0 (Jan. 2018), "3rd Generation Partnership Project; Technical Specification Group Radio Access Network; NG-RAN NG Application Protocol (NGAP), (Release 15)", pp. 1-94, (Jan. 2016).
3GPP TS38.331 V15.0.0 (Dec. 2017), "3rd Generation Partnership Project; Technical Specification Group Radio Access Network; N; Radio Resource Control (RRC) Protocol Specification, (Release 15)", pp. 1-158, (Dec. 2017).
3GPP TS22.261 V16.2.0 (Dec. 2017), "3rd Generation Partnership Project; Technical Specification Group Services and System Aspects; Service Requirements for the 5G System; Stage 1, (Release 16)", pp. 1-53, (Dec. 2017).
3GPP TR21.905 V14.1.1 (Jun. 2017), "3rd Generation Partnership Project; Technical Specification Services and System Aspects; Vocabulary for 3GPP Specifications, (Release 14)", pp. 1-66, (Jun. 2017).
R2-1712350, "Siice Assistance Information Over RRC", 3GPP TSG-RAN WG2 Meeting #100, Reno, USA, Nov. 27-Dec. 1, 2017, Nokia, Nokia Shanghai Bell.
R2-1700099, Key Issues for Support of Network Slicing in RAN 3GPP TSG-RAN WG2 NR Ad Hoc, Spokane, Washington, USA, Nov. 17-19, 2017, Huawei, HiSilicon.
C1-174813, "Handling of S-NSSAI Based Congestion Control", 3GPP TSG-CT WG1 Meeting #107, reno, USA, Nov. 27-Dec. 1, 2017, vivo.
International Search Reporyt and Written Opinion dated Apr. 9, 2019, issued in counterpart International Application No. PCT/JP2019/000341.
Supplementary European Search Report for EP Application No. 15753665.9 dated on Feb. 16, 2021.
Huawei et al., UE Siice Association/Overload control Procedure, May 23, 2016, 3GPP, 3GPP TSG SA WG2 Meeting #115, Tdoc: W2-162981 (Year: 2016).
Ericsson et al., Support for Congestion/Control, Oct. 23, 2017, 3GPP, SA WG2 Meeting #123, Tdoc: S2-176984 (Year: 2016).
Ericsson et al., Support for Congestion/Control, Oct. 23, 2017, 3GPP, SA WG2 Meeting #123, Tdoc: S2-176985 (Year: 2016).
Nokia et al., TS 23.501: OI#5—Overload Control, Oct. 23, 2017, 3GPP, SA WG2 Meeting #123, Tdoc: S2-178070 (Year: 2016).
Samsung, P-CR 23.501 S-NSSAI based Congestion Control, Nov. 27, 2016, 3GPP, SA WG2 Meeting #124, Tdoc: S2-178691 (Year: 2016).
Japanese Office Action for JP Application No. 2022-195292 dated Mar. 7, 2023 with English Translation.
Motorola Mobility, Lenovo, Broadcom, Nokia, Nokia Shanghai Bell, Brocade, Rogers Communications, Samsung, LGE, ITRI, CMCC, CATT, Cisco, CATR, NEC et al., "Details of EAP-5G Solution for registration via untrusted non-3GPP access", 3GPP TSG SA WG2 #123, S2-176969, Oct. 13, 2017.
JP Office Communication for JP Application No. 2021-130453, dated Nov. 8, 2022 with English Translation.
3GPP TSG SA, "Study on the security Aspects of the next generation system (Release 14)", 3GPP TR 33.899 v1.3.0 (Aug. 20178), Aug. 21, 2017.
JP Office Action for JP Application No. 2022-195292, dated Aug. 15, 2023 with English Translation.
HUAWEI,"Overload control", 3GPP TSG RAN WG3 #99 R3-181105, Feb. 16, 2018, pp. 1-pp. 8, Athens, Greece.

* cited by examiner

DISTINGUISHING BETWEEN GENERAL NAS LEVEL CONGESTION AND S-NSSAI RELATED CONGESTION CONTROL

CROSS-REFERENCE TO RELATED APPLICATIONS

The present application is a continuation application of U.S. patent application Ser. No. 16/322,637 filed on Feb. 1, 2019, which is a National Stage Entry of international application PCT/JP2019/000341 filed on Jan. 9, 2019, which claims the benefit of priority from Indian Patent Application 201811006021 filed on Feb. 16, 2018, the disclosures of all of which are incorporated in their entirety by reference herein.

TECHNICAL FIELD

This invention is related to a procedure of handling network congestion. More specifically this invention is related to a procedure which indicates different type of network congestion to the UE by the network.

BACKGROUND ART

Non patent literature 1 (TS23.501 V15.0.0) shows 5G System Architecture (see FIG. 10) and some overload/congestion control methods. One example of the control methods is AMF Overload Control as below.

Under unusual circumstances, if AMF has reached overload situation, the AMF activates NAS level congestion control as specified in Clause 5.19.7 of the Non patent literature 1 and AMF restricts the load that the AN node(s) are generating, if the AN is configured to support overload control. N2 overload control can be achieved by the AMF invoking the N2 overload procedure (see TS 38.300 and TS 38.413) to all or to a proportion of the AN nodes with which the AMF has N2 connections. The AMF may include the S-NSSAI(s) in N2 overload control message sent to AN node(s) to indicate the congestion of the Network Slice(s) at the CN part. To reflect the amount of load that the AMF wishes to reduce, the AMF can adjust the proportion of AN nodes which are sent NGAP OVERLOAD START message, and the content of the overload start procedure.

The AMF should select the 5G-AN node(s) to which it triggers overload start procedure at random to avoid that multiple AMFs in an AMF Set request reduction of load from the same subset of 5G-AN node(s).

An AN node supports rejecting of AN signalling connection establishments for certain UEs as specified in TS 38.331. Additionally, an AN node provides support for the barring of UEs as described in TS 22.261. These mechanisms are further specified in TS 38.331.

Using the overload start procedure, the AMF can request the AN node to:
 reject AN signaling connection (RRC connection over 3GPP access or UE-N3IWF connection over N3GPP access) requests that are for non-emergency and non-high priority mobile originated services; or
 reject new AN signaling connection requests for uplink NAS signalling transmission to that AMF;
 release AN signalling connection for uplink NAS signalling transmission where the Requested NSSAI at AS layer only includes the indicated S-NSSAI(s).
 only permit AN signaling connection requests for emergency sessions and mobile terminated services for that AMF; or
 only permit AN signaling connection requests for high priority sessions and mobile terminated services for that AMF;

The AN signaling connection requests listed in this clause also include the request from UE in RRC-Inactive state.

The AMF can provide percentage value that indicates how much amount of signalling traffic to be rejected in the overload start message, and the AN node may consider this value for congestion control.

When rejecting an AN signaling connection request for overload reasons the AN indicates to the UE an appropriate wait timer value that limits further AN signaling connection requests for a while.

During an overload situation, the AMF should attempt to maintain support for emergency services and for MPS.

When the AMF is recovering, the AMF can either:
 trigger overload start procedure with new percentage value that permit more signalling traffic to be carried, or the AMF trigger overload stop procedure.
 to some or all of the 5G-AN node(s).

CITATION LIST

Non Patent Literature

NPL 1: TS23.501 V15.0.0 (2017-12)

SUMMARY OF INVENTION

Technical Problem

General Problem Statement

According to the description of the AMF Overload Control in the non-patent document 1, the AMF may include the S-NSSAI(s) in N2 overload control message sent to AN node(s). However, in the current procedure, the UE cannot perform an appropriate behaviour regarding the congestion as information which is sent from the AN node is insufficient.

This invention solves following five issues which are related to general NAS level congestion control mechanism and network slice congestion control mechanism.

Problem Statement 1:

No information is sent with wait timer to the UE to identify if wait timer is related to General NAS level congestion or a network slice congestion.

Under general overload condition the network applies General NAS congestion control mechanism and sends a message to NG-RAN instructing NG-RAN to reject a request to establish an AN signalling connection. Following this, the NG-RAN rejects AN Signalling connection and sends wait timer in an AN signalling message.

Under a network slice overload condition, the AMF sends a message including network slice id (S-NSSAI(s)) of the congested network slice to the NG-RAN to reject the AN signalling connection. The NG RAN will reject the AN signalling connection and send wait time to the UE in a AN signalling connection.

So a wait timer is sent to the UE under two situations when a AMF applies General NAS level congestion control and a network slice related congestion control. The UE doesn't know whether the wait timer is related to a network slice congestion or a general NAS level congestion. Therefore, the UE behaviour becomes non deterministic when it receives a wait time without an indication identifying whether the wait timer is related to general NAS level congestion timer or a network slice congestion.

Problem Statement 2:

Network Slice Identifier of the congested network slice with wait timer is not being sent to the UE.

When the NG-RAN receives a message containing network slice identifier of the congested network slice to start the overload control procedure, then NG-RAN is releasing or rejecting the AN signalling connection without sending the wait time and a network slice identifier of the congested network. The UE may again initiate procedure (NAS or AS) related to congested network slice and may again congest the network (AMF/SMF/NG-RAN).

Problem Statement 3:

No mechanism is defined to handle a scenario at NG-RAN for a UE when some network slice related to the UE are congested and some network slice related to the UE are not congested.

The NG-RAN receives a message (e.g. NGAP OVERLOAD START) containing a network slice identifier of the congested network slice from the AMF to start congestion control related to the network slice. The UE has a PDU session(s) established related to the network slice and a PDU session(s) related to other network slice. In this scenario the NG-RAN behaviour regarding the UE is not clear or non-deterministic. It is not clear whether the NG-RAN will release all AN connection or only release the resources related to the congested network slice only.

Problem Statement 4:

When a AN connection is established during the service request procedure, the S-NSSAI for which the service request procedure is initiated is not included in the AN signalling message. Since a AN signalling Request message doesn't contain requested NSSAI during AN signalling establishment procedure therefore the RAN cannot perform RAN overload control procedure related to a congested network slice. If a lot of UE is initiating service request procedure to establish a PDU session then AN cannot reject AN connection establishment and send the message to AMF or SMF then the AMF/SMF gets further congested. This may lead to severe network failure.

Problem Statement 5:

When a UE is establishing a AN signalling connection related to a S-NSSAI to N3IWF for a non-3GPP access, then no procedure is defined to send a congested S-NSSAI and corresponding wait time.

Solution to Problem

A Next Generation Radio Access Network (NG-RAN) node according to a first exemplary aspect of the present disclosure includes an NG interface connected with an Access-mobility Management Function (AMF), a transceiver configured to communicate with a User Equipment (UE), a processor configured to receive, from the AMF via the NG interface, NGAP OVERLOAD START message including a first Single Network Slicing Selection Assistance Information (S-NSSAI) list that includes one or more S-NSSAIs indicating one or more congested network slices respectively receive, from the UE via the transceiver, a Radio Resource Control (RRC) message including a second S-NSSAI list that includes one or more S-NSSAIs, and transmit, to the UE via the transceiver, an RRC Release message including a wait timer that limits further RRC connection request by the UE until the wait timer expires, in a case where the one or more S-NSSAIs in the second S-NSSAI list only include the one or more S-NSSAIs in the first S-NSSAI list.

A User Equipment (UE) according to a second exemplary aspect of the present disclosure includes a transceiver configured to communicate with a Next Generation Radio Access Network (NG-RAN) node, a processor configured to transmit, to the NG-RAN node via the transceiver, a Radio Resource Control (RRC) message including a S-NSSAI list that includes one or more S-NSSAIs, and receive, from the NG-RAN node via the transceiver, an RRC Release message including a wait timer that limits further RRC connection establishment request by the UE until the wait timer expires, in a case where the one or more S-NSSAIs in the second S-NSSAI list only indicate one or more congested network slices respectively, wherein the UE does not initiate the further RRC connection request until the wait timer expires.

A method for a Next Generation Radio Access Network (NG-RAN) node according to a third exemplary aspect of the present disclosure includes receiving, from an Access-mobility Management Function (AMF) via an NG interface between the NG-RAN node and the AMF, NGAP OVERLOAD START message including a first Single Network Slicing Selection Assistance Information (S-NSSAI) list that includes one or more S-NSSAIs indicating one or more congested network slices respectively, receiving, from a User Equipment (UE) via a transceiver implemented in the NG-RAN node, a Radio Resource Control (RRC) message including a second S-NSSAI list that includes one or more S-NSSAIs, and transmitting, to the UE via the transceiver, an RRC Release message including a wait timer that limits further RRC connection request by the UE until the wait timer expires, in a case where the one or more S-NSSAIs in the second S-NSSAI list only include the one or more S-NSSAIs in the first S-NSSAI list.

A determination method used in an UE according to a Fourth exemplary aspect of the present disclosure includes receiving an AN message containing a list of S-NSSAI and wait time of each S-NSSAI in the list and determining that congestion related to network slice is occurred based on the AN message.

A method for a User Equipment (UE) according to a Fourth exemplary aspect of the present disclosure includes transmitting, to a Next Generation Radio Access Network (NG-RAN) node via a transceiver implemented in the UE, a Radio Resource Control (RRC) message including a S-NSSAI list that includes one or more S-NSSAIs, and receiving, from the NG-RAN node via the transceiver, an RRC Release message including a wait timer that limits further RRC connection request by the UE until the wait timer expires, in a case where the one or more S-NSSAIs in the second S-NSSAI list only indicate one or more congested network slices respectively, wherein the UE does not initiate the further RRC connection request until the wait timer expires.

DESCRIPTION OF EMBODIMENTS

Figure 1:
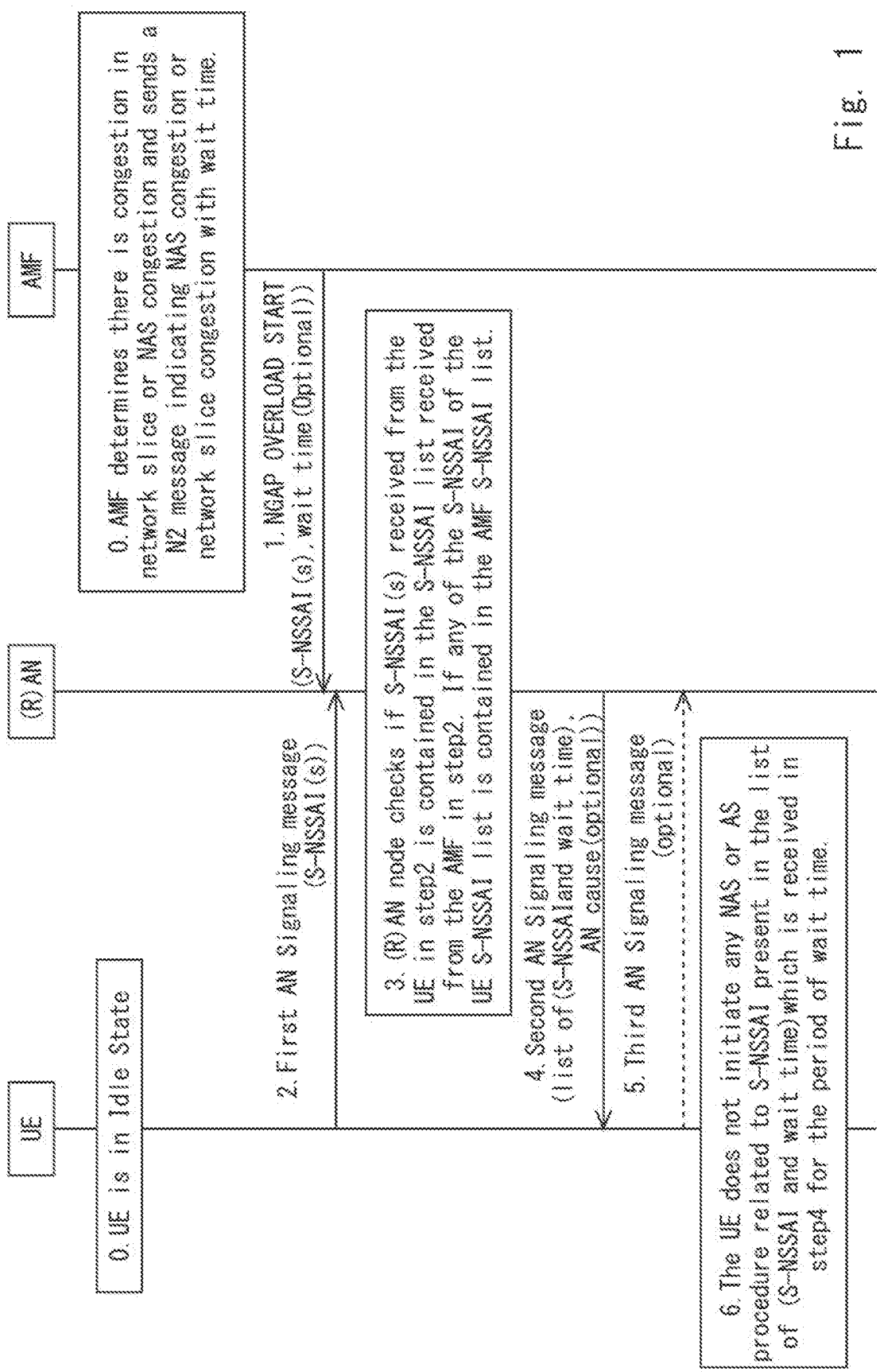
FIG. 1 is a procedure related to handling of congestion control at (R)AN node and the UE.

For the purposes of the present document, the abbreviations given in TR 21.905 and the following apply. An abbreviation defined in the present document takes precedence over the definition of the same abbreviation, if any, in TR 21.905.

5GC 5G Core Network
5GS 5G System
5G-AN 5G Access Network
5G-GUTI 5G Globally Unique Temporary Identifier
5G-S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
DL Downlink
DN Data Network
DNAI DN Access Identifier
DNN Data Network Name
EDT Early Data Transmission
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
N3IWF Non-3GPP InterWorking Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy In order to make both general NAS level congestion control and network slice congestion control works together, a procedure is needed by a (R)AN node to send a congested S-NSSAI with wait time to the UE so that the UE does not need initiates any signaling related to the S-NSSAI for the duration of wait time due to following reasons:

(1) S-NSSAI and back off timer transmission by NAS message causes additional load to AMF that is already in overload state, because the AMF needs to transmit the NAS message to large numbers of UEs.

(2) Number of the AN connected with one AMF is smaller than number of the UE which has connection with the one AMF.

(3) Therefore, by using AN message (from AN to UE) for S-NSSAI and back off timer transmission, AMF has only to transmit the Overload message to AN.

The reasons also include to protect the (R)AN node when it is congested or to prevent RAN node getting congested.

This invention discloses the following technical aspects to the overload control in the 5GS.

(1) A RAN node receives a N2 message (e.g. NGAP OVERLOAD START) containing a list of S-NSSAI of the congested network slice and optionally a wait timer for each S-NSSAI in the list from AMF.

(2) The RAN node sends a list of S-NSSAI and a wait timer for each S-NSSAI in the list in an AN signaling message to the UE when the RAN receives, from the UE, a AN signaling message containing a list of S-NSSAI to establish a AN signaling connection and the S-NSSAI(s) is indicated in the N2 message as congested by the AMF.

(3) Upon receiving the AN message containing a list of S-NSSAI and wait time of each S-NSSAI in the list by the UE, the UE determines (considers) that congestion related to network slice is occurred. And then, the UE does not initiate any NAS and AS procedure (i.e. does not send any NAS or AS message) related to S-NSSAI contained in the list for the timer period indicated in the wait time of an S-NSSAI, i.e. until the wait timer expires. In other words, the UE may initiate any NAS and AS procedure (i.e. sends some NAS or AS message) related to S-NSSAI contained in the list if the wait timer expires.

(4) Upon receiving the AN message containing only wait time, the UE determines that the wait time is related to a NAS congestion or some other abnormal network conditions. The UE does not initiate any NAS and AS procedure for the period of wait time, i.e. until the wait timer expires. The AN massage may contain an explicit indication that NAS congestion gets underway.

(5) In one scenario, the list of S-NSSAI contains a single S-NSSAI.

(6) In one scenario, the AN message to the UE contains an information element (e.g. AN cause, RRC cause) indicating congestion in the network together with list of S-NSSAI and wait time in the network. When the UE receives the information element indicating congestion in the network and together with a list of S-NSSAI and a wait time for each S-NSSAI in the list, the UE determines (considers) that the network slice corresponding to S-NSSAI in the list is congested. The UE does not send any NAS or AS message related to the S-NSSAI present in the list till the period of wait time of the S-NSSAI expires. The list of S-NSSAI may be composed of only configured S-NSSAI to the UE. The list of S-NSSAI may be composed of all S-NSSAI that the AMF is aware of them as congested.

(7) In one scenario, the AN message to the UE contains an information element indicating network slice congestion together with list of S-NSSAI and wait time for each S-NSSAI in the list. When the UE receives the AN message containing an information element indicating network slice congestion then the UE determines (considers) that there is congestion in the network slices corresponding to the S-NSSAI(s) present in the list of S-NSSAI. The UE does not initiate any NAS procedure i.e. does not send any NAS or AS message related to S-NSSAI(s) present in the received S-NSSAI list till the time period of the wait time corresponding to each S-NSSAI expires.

(8) In one scenario, the AN message to the UE does not contain any list of S-NSSAI but contains the information element (e.g. AN cause, RRC cause) indicating congestion in the network, then the UE determines (considers) that there is NAS level congestion in the network or AS level congestion in the network and does not initiate any NAS procedure i.e. does not send any NAS or AS message.

(9) The NAS procedure is Registration Management procedure (Registration procedure related to initial registration or mobility registration), Connection management (Service Request procedure) procedure and session management procedure (PDU Session establishment or PDU session management procedure). The AS procedure is AN signaling connection establishment procedure (e.g. RRC Connection Establishment procedure).

The FIG. 1 shows a procedure related to handling of congestion control at (R)AN node and the UE when AMF indicates that congestion related to network slice congestion or general NAS congestion.

The network ((R)AN and AMF) and the UE will follow the procedure as described in the FIG. 1 and procedure as described below.

0. If AMF determines there is congestion in the network slice(s) the AMF sends a N2 message (NGAP OVERLOAD START) containing a list of S-NSSAI which are congested and optionally, the wait time for each S-NSSAI. The value of the wait time is determined by the local congestion situations in the AMF related to the network slices. If the AMF detects general NAS level congestion then the network indicates it to the (R)AN node and optionally contains wait time which value is determined by the AMF depending on the network condition in the AMF.

1. The (R)AN node receives a N2 message (S-NSSAI(s), wait time (Optional)) (e.g. NGAP OVERLOAD START) containing a list of S-NSSAI of the congested network slice and optionally a wait timer for each S-NSSAI in the list from AMF. The N2 message is requesting the (R)AN node to start overload control related to the list of S-NSSAI sent in the N2-message as per the procedure defined in sub clause 5.19.5.2 of Non-patent literature 1 (TS 23.501). The wait time included for each S-NSSAI indicates the period after which the network may not experience network slice related congestion. In other words, expiry of the wait timer may indicates it is expected that the network slice related congestion was no longer.

2. The (R)AN node receives a first AN signaling message containing a list of S-NSSAI to establish a AN signaling connection from a UE. The first AN signaling message is a RRC Connection Request message or a RRC Connection Setup complete message or any other existing RRC message or a new RRC message which is sent by the UE during the (R)AN signaling connection establishment procedure. If the EDT procedure is enabled, a list of S-NSSAI may be sent by the UE using the RRC Connection Request message.

3. The (R)AN node checks if S-NSSAI(s) received from the UE in step 2 is contained in the S-NSSAI list received from the AMF in step 0. If any of the S-NSSAI of the UE S-NSSAI list is contained in the AMF S-NSSAI list then the (R)AN sends a second AN signaling message containing list of matching S-NSSAI and corresponding wait time to the UE as mentioned in step 4. The second AN signaling message is a RRC Connection Reject message or RRC Connection Release message or any other existing RRC message or a new RRC message which is sent by the UE during the (R)AN signaling connection establishment procedure to handle error cases when (R)AN connection cannot be established. The (R)AN node sends RRC Connection Reject if the first AN message is RRC Connection Request message or the (R)AN sends RRC Connection Release message if the first AN message is RRC connection setup complete message.

In one scenario in above case of step 3, the (R)AN node provides an additional information in a first information element (e.g. AN cause or RRC cause) indicating the reason for failure in establishing the AN signaling connection together with list of S-NSSAI and wait time in the second AN signaling message. The information element contains a value congestion if RAN detects general NAS level congestion or network slice congestion if RAN detects congestion in the network slice(s).

In case, the AN signaling connection establishment is rejected due to NAS level congestion then the AN node set the information element with value congestion and includes wait time in the first AN message and does not include list of S-NSSAI and their wait time. In one case it just includes wait time in the second AN signaling connection and does not include list of S-NSSAI and their wait time and the first information element.

In one scenario in the above case, the wait time sent for each S-NSSAI to the UE may be same as or based on the wait time provided by the AMF for this S-NSSAI.

In one scenario in the above case, the wait time sent for each S-NSSAI to the UE is derived by the (R)AN node by considering the wait time received from the AN node for this S-NSSAI as one input parameter in deriving the wait time.

In one scenario when the wait time is not received from the AMF then the (R)AN decides wait time for each S-NSSAI by itself or on some other parameters provided by AMF in the N2 message.

4. The UE receives the second AN signaling message (e.g. RRC Connection Reject). The UE releases the AN signaling connection if the AN signaling connection was established or abort the AN signaling connection when AN signaling connection establishment was initiated.

5. The UE optionally sends the third AN signaling message (e.g. RRC connection Release complete if the second AN signaling message was RRC Connection Release Request). The third AN signaling message indicates acknowledgment for the second AN signaling message and indicates the successful release of the AN signaling connection when the AN connection was established successfully.

6. If the second AN signaling message contains the information element set to network slice congestion or congestion, and contains the list of S-NSSAI and wait time for each S-NSSAI then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the second AN signaling message contains the list of S-NSSAI and wait time for each S-NSSAI and does not contain the first information element then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node. The UE may initiate NAS procedure or AS procedure related to a S-NSSAI present in the list of S-NSSAI received from the (R)AN node if the wait timer expires.

If the second AN signaling message contains wait time and does not contain the list of S-NSSAI and their wait time, and the first information element, then the UE does not initiates any NAS or AS procedure i.e. the UE does not send any AS or NAS signaling message to the network. The UE does not establish any AS or NAS signaling connection. The UE determines that the AN signaling connection establishment fails due to general NAS level congestion.

If the second AN signaling message contains the information element which value is set to congestion, and wait time but does not contain list of S-NSSAI and then the UE does not initiates any NAS or AS procedure i.e. the UE does not send any AS or NAS signaling message to the network. The UE does not establish any AS or NAS signaling connection. The UE determines that the AN signaling connection establishment fails due to general NAS level congestion with the network.

In another scenario, the AN, the UE and the AMF may performs as following steps:

1. The AMF sends the N2 message indicating that overload is (full/partial) recovering in the AMF (e.g. OVERLOAD STOP message) to AN or triggers overload start procedure with new percentage value that permit more signalling traffic to be carried.

2. The AN transmits, to the UE, information indicating that the AMF/Slice is recovering, in response to the step 1. The information indicating that the AMF/Slice is recovering may be broadcasted by the AN.

3. Upon reception of the information indicating that the AMF/Slice is recovering, the UE may operate step (a) or (b) as following:

a. initiate the AN signalling connection upon reception of the information indicating that the AMF/Slice is recovering, even if the Wait Time (back off timer) is running, or b. consider that the Wait Time (wait timer) expires if the UE receives the information indicating that the AMF/Slice is recovering.

In this embodiment, the AMF determines the timer value and the AMF optionally sends the timer value to the (R)AN node. However, the (R)AN node can determine the timer value instead of the AMF. The (R)AN node can determine the timer value based on information from the AMF. The information can be, for example, load level information (e.g. 1. very high/high/middle/low 2. percentage of the load). The variation that the (R)AN node determines the timer value can be applied to other embodiment in this description.

Figure 2:
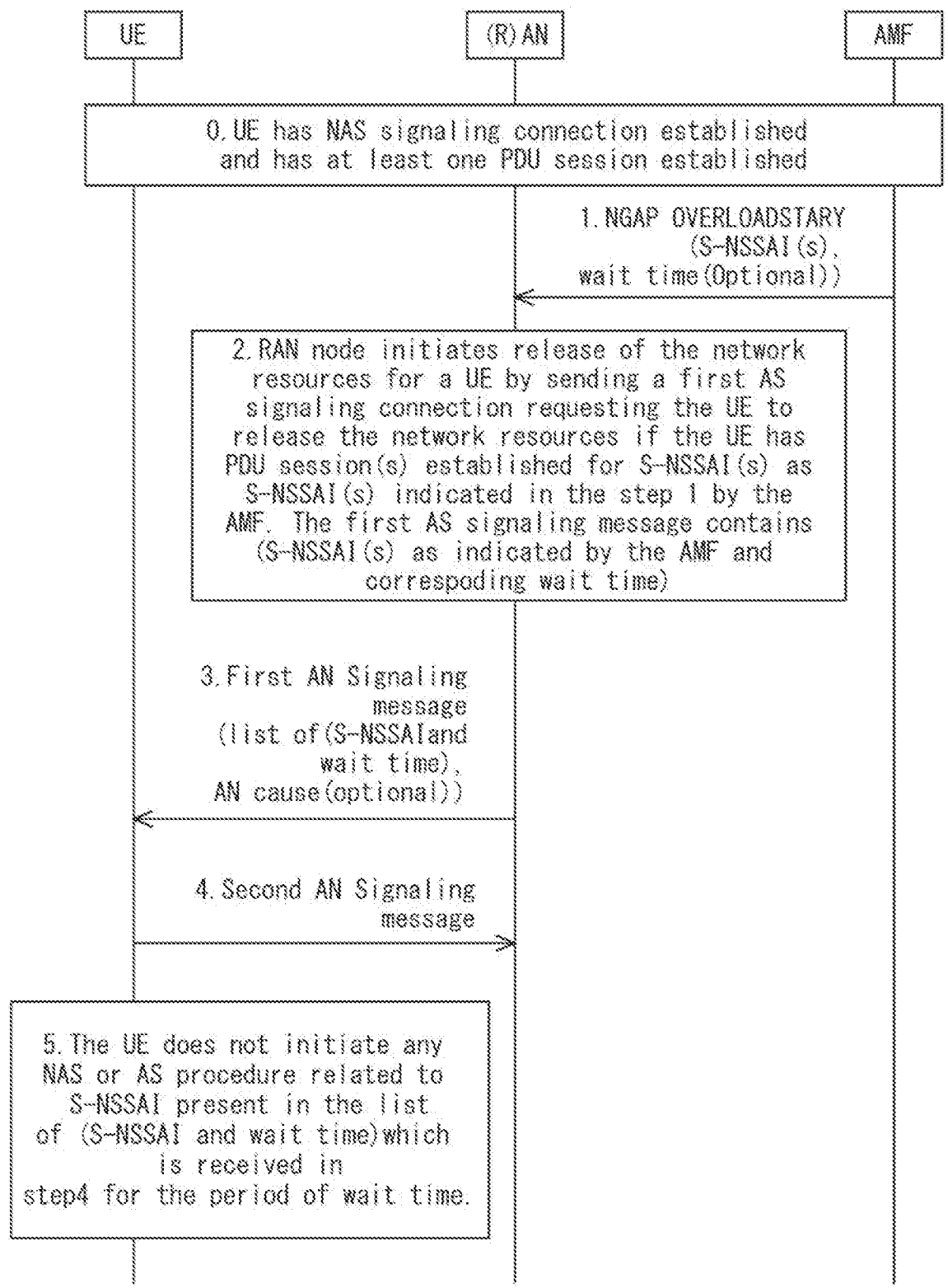
FIG. 2 is a procedure for the scenario when the UE has NAS signaling connection established and has at least one PDU session established.

The FIG. 2 shows a procedure for the scenario when the UE has NAS signaling connection established and has at least one PDU session established.

The network ((R)AN and AMF) and the UE will follow the procedure as described in the FIG. 2 and procedure as described below.

0. A UE has established PDU sessions related to different network slices (i.e. different S-NSSAI).

1. The AN receives a N2 message (e.g NGAP OVERLOAD START) containing a list of congested S-NSSAI from the AMF.

2. The AN identifies that not all S-NSSAI of the UE is congested.

3. The AN initiates a selective release of the network resources related to the congested S-NSSAI(s) by sending a first AN signaling message containing a list of congested S-NSSAI and instructing the UE to release the network resources. The AN sends, to the UE, the first AN signaling message. This first AN message is a new AN message or existing AN message containing a new information element indicating to release the network resources related to S-NSSAI.

4. The UE sends the second AN signaling message to the AN indicating an acknowledgement of the first AN signaling message.

5. When a UE receives a first AN signaling message from the AN containing list of S-NSSAI and indicating the UE to release the network resources then the UE will release all the network resources related to the S-NSSAI present in the list but keep the PDU session(s) established. The network resources are AN resources and CN resources. The AN and CN resources further comprise signalling (i.e. control plane) resources and user plane resources. The example of AN resources are DRB and SRB and example of the CN resources are GTP-U resources and QoS flows. From another perspective, the AN resources may be all radio resources including at least one of the RLC entity, the MAC configuration and the associated PDCP entity for all established radio bearers.

In the description above, AN signaling message is shown. An example of the AN signaling message is RRC connection release.

Also, in the description above, an example to release the network resources relates to S-NSSAI. The network resource can be identified by not only the S-NSSAI but also a current PDU session ID.

When the UE sends, to the AMF, a PDU session Establish Request which includes any one of parameters below after a back-off timer expires.

S-NSSAI

Current(or Old) PDU session ID

New PDU session ID

Combination of the parameters above

This resource identification in this embodiment can be applied to other embodiment in this description.

Figure 3:
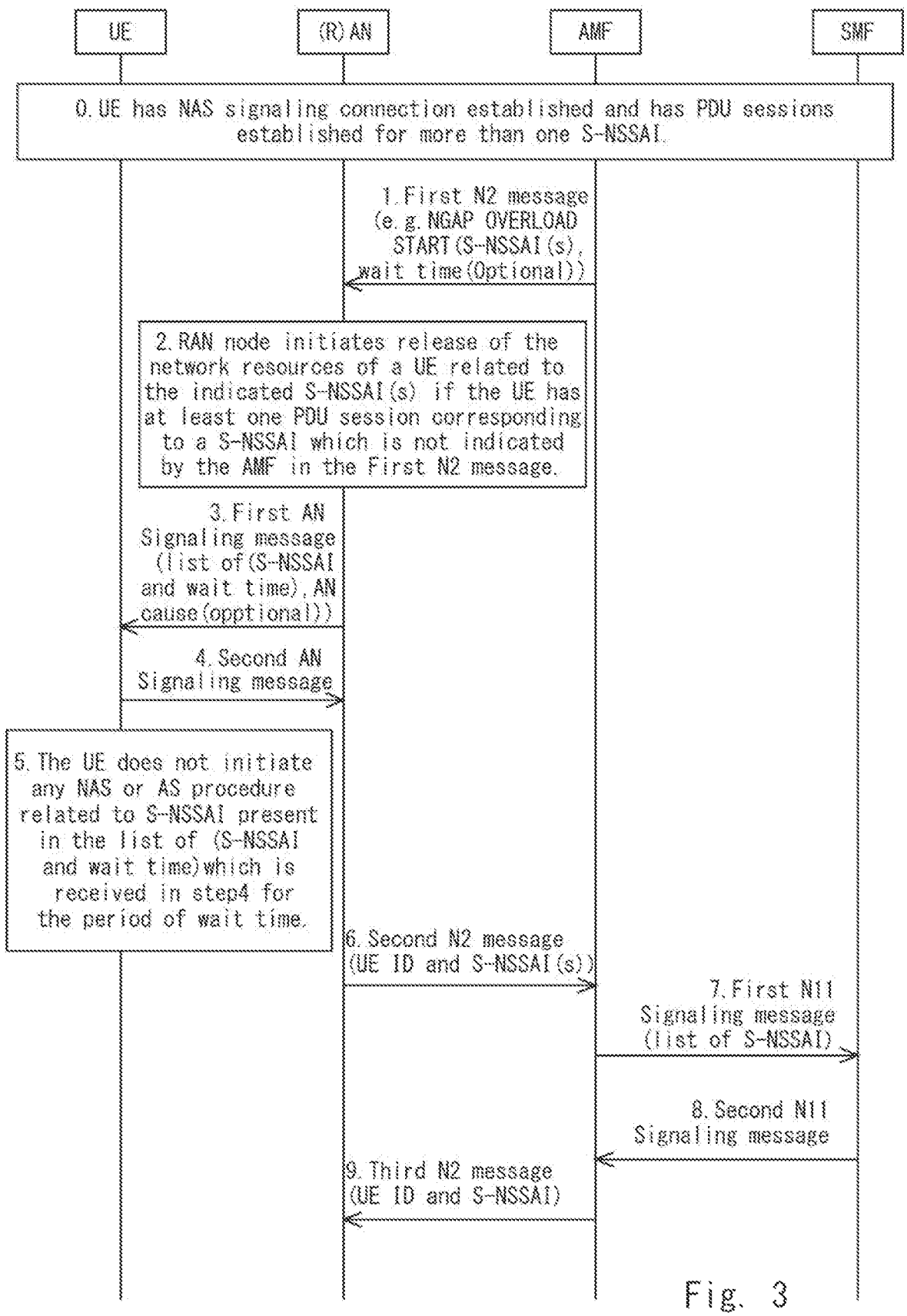
FIG. 3 is a procedure related to release of network resources of a congested network slice(s) only and keeping network resources of non-congested slice(s).

The FIG. 3 shows a procedure related to release of network resources of a congested network slice(s) only and keeping network resources of non-congested slice(s).

In this procedure the network resources are AN resources and CN resources. The AN and CN resources further comprise signalling resources and user plane resources. The example of AN resources is DRB and SRB and example of the CN resources are GTP-U resources and QoS flows. From another perspective, the AN resources may be all radio resources including at least one of the RLC entity, the MAC configuration and the associated PDCP entity for all established radio bearers.

0. The UE has NAS signalling connection established and has PDU sessions established for more than one S-NSSAI.

1. The (R)AN node receives a N2 message (S-NSSAI(s), wait time (Optional)) (e.g. NGAP OVERLOAD START) containing a list of S-NSSAI of the congested network slice and optionally a wait timer for each S-NSSAI in the list from AMF. The N2 message is requesting the (R)AN node to start overload control related to the list of S-NSSAI sent in the N2-message as per the procedure defined in sub clause 5.19.5.2 of Non patent literature 1. The wait time included for each S-NSSAI indicates the period after which the network may not experience network slice related congestion.

2. If a UE has PDU sessions established for the S-NSSAI (s) indicated in the first N2 message and the UE has PDU session(s) for the S-NSSAI not indicated in the S-NSSAI then the (R)AN node sends a first AN signaling message containing a list of S-NSSAI and wait timer for each S-NSSAI in the list and requests a UE to release the network resources related to the S-NSSAI indicated in the list and keep the PDU session(s) established. The (R)AN node keeps the network resources for the PDU sessions related to S-NSSAI(s) not indicated in the first N2 message. The first AN signaling message is a new message or an existing AN signaling message.

3. A UE receives the first AN signaling message containing a list of S-NSSAI and corresponding wait time. The UE releases all the network resources related to the indicated S-NSSAI(s) and keep the PDU session(s) established. The UE does not release any network resources related to the S-NSSAI which not indicated in the first AN signaling message.

4. The UE sends the second AN signaling message to the AN.

5. If the first AN signaling message contains the information element set to network slice congestion or congestion, and contains the list of S-NSSAI and wait time for each S-NSSAI then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the first AN signaling message contains the list of S-NSSAI and wait time for each S-NSSAI and does not contain the first information element then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

6. After step 2, the (R)AN node sends a second N2 message to the AMF containing list of S-NSSAI and UE ID requesting AMF to release the network resources related to the PDU sessions established for the S-NSSAI(s) present in the list. The N2 message is a new N2 message.

The AMF receives the second N2 message and initiates network resources release procedure related to the PDU session(s) corresponding to the S-NSSAI(s) present in the list by sending a message to the related SMF.

7. The SMF on receiving the N11 message releases the network resources related to the PDU session(s) which are related to S-NSSAI(s) of the UE. The SMF optionally sends a response message back to AMF indicating the successful release of the network resources related to PDU session(s) of indicated S-NSSAI(s).

8. The AMF receives a second N11 message. The AMF optionally sends a third N2 message acknowledging the successful release of the network resources related to the PDU session(s) of indicated S-NSSAI(s).

9. The (R)AN on receiving the third N2 message completes the network resource release procedure for the UE.

Figure 4:
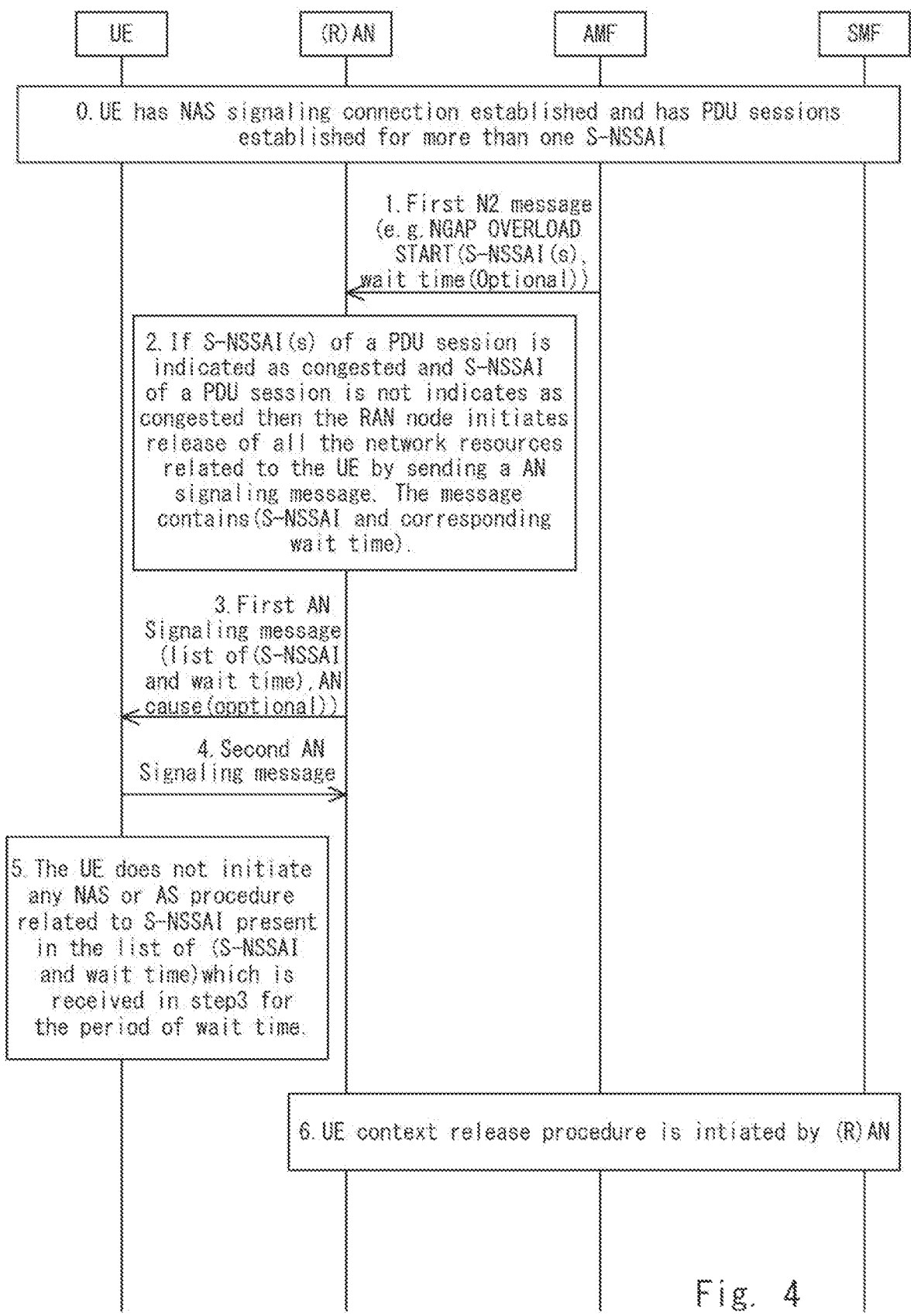
FIG. 4 is a procedure releasing network resources related to all S-NSSAI if one S-NSSAI related to the UE is indicated as congested by the AMF.

The FIG. 4 shows a procedure releasing network resources related to all S-NSSAI if one S-NSSAI related to the UE is indicated as congested by the AMF. This procedure discloses the following technical aspects to the overload control in the 5GS.

(1) A UE has established PDU session(s) for different network slices. The AN receives a N2 message containing a list of congested S-NSSAI. The AN identifies that not all S-NSSAI of the UE is indicated as congested and initiates a release all the network resources of the UE by sending a AN signaling message. The AN message is an existing AN message indicating release of all network resources or a new AN message requesting the UE to release all the network resources.

(2) When a UE receives a AN messaging which requests to release all the network resources then the UE will release all the network resources allocated to the UE. The UE goes to idle state.

0. The UE has NAS signalling connection established and has PDU sessions established for more than one S-NSSAI.

1. The (R)AN node receives a N2 message (S-NSSAI(s), wait time (Optional)) (e.g. NGAP OVERLOAD START) containing a list of S-NSSAI of the congested network slice and optionally a wait timer for each S-NSSAI in the list from AMF. The N2 message is requesting the (R)AN node to start overload control related to the list of S-NSSAI sent in the N2-message as per the procedure defined in sub clause 5.19.5.2 of Non patent literature 1. The wait time included for each S-NSSAI indicates the period after which the network may not experience network slice related congestion.

2. RAN checks for a UE if the UE has PDU sessions established for the S-NSSAI(s) which is indicated in the first N2 message and the UE has PDU sessions for the S-NSSAI which is not indicated in the S-NSSAI then the (R)AN node initiates release of network resources by sending a first AN message containing list of S-NSSAI of the UE which was indicated by the AMF, corresponding wait time and optionally a First Information Element indicating cause of release of AN connection.

In one scenario in above case of step 2, the (R)AN node provides an additional information in a first information element (e.g. AN cause or RRC cause) indicating the reason for failure in establishing the AN signaling connection together with list of S-NSSAI and wait time in the second AN signaling message. The information element contains a value congestion if RAN detects general NAS level congestion or network slice congestion if RAN detects congestion in the network slice(s).

In case the AN signaling connection establishment is rejected due to NAS level congestion then the AN node set the information element with value congestion and includes wait time in the first AN message and does not include list of S-NSSAI and their wait time. In one case it just includes wait time in the second AN signaling connection and does not include list of S-NSSAI and their wait time and the first information element.

In one scenario in the above case the wait time sent for each S-NSSAI to the UE is same as the wait time provided by the AMF for this S-NSSAI.

In one scenario in the above case the wait time sent for each S-NSSAI to the UE is derived by the (R)AN node by considering the wait time received from the AN node for this S-NSSAI as one input parameter in deriving the wait time.

In one scenario when the wait time is not received from the AMF then the (R)AN decides wait time for each S-NSSAI by itself or on some other parameters provided by AMF in the N2 message.

3. The UE receives the second AN signaling message. The UE releases the AN signaling connection if the AN signaling connection was established or abort the AN signaling connection when AN signaling connection establishment was initiated.

4. The UE optionally sends the third AN signaling message (e.g. RRC connection Release complete if the second AN signaling message was RRC Connection Release Request) acknowledging the second AN signaling message and indicating the successful release of the AN signaling connection when the AN connection was established successfully.

5. If the second AN signaling message contains the information element set to network slice congestion or congestion, and contains the list of S-NSSAI and wait time for each S-NSSAI then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the second AN signaling message contains the list of S-NSSAI and wait time for each S-NSSAI and does not contain the first information element then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the second AN signaling message contains wait time and does not contain the list of S-NSSAI and their wait time, and the first Information element, then the UE does not initiates any NAS or AS procedure i.e. the UE does not send any AS or NAS signaling message to the network. The UE does not establish any AS or NAS signaling connection.

If the second AN signaling message contains the information element which value is set to congestion, and wait time but does not contain list of S-NSSAI and then the UE does not initiates any NAS or AS procedure i.e. the UE does not send any AS or NAS signaling message to the network. The UE does not establish any AS or NAS signaling connection.

6. The (R)AN node initiate UE context release procedure as defined in sub clause 4.2.6 of TS Non patent literature 1.

Figure 5:
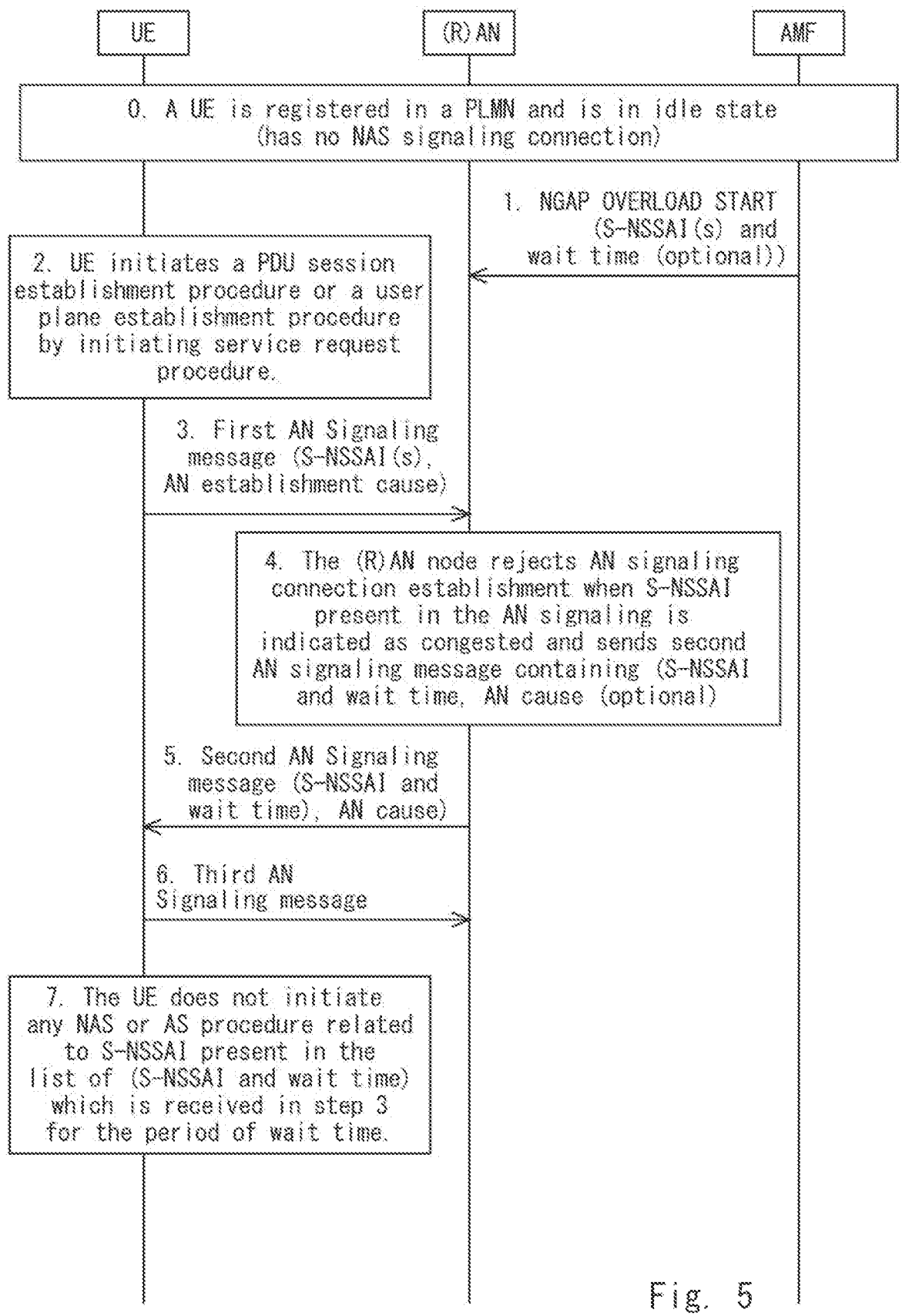
FIG. 5 is a Handling of network slice related congestion at AN node during service request procedure.

The FIG. 5 shows a handling of network slice related congestion at AN node during service request procedure. This procedure discloses the following technical aspects to the overload control in the 5GS.

(1) A UE includes a S-NSSAI related to the PDU session which is to be activated in a AN signaling message during the AN signaling connection establishment. If the service request is to be triggered to activate more than one PDU session and these PDU sessions is related to different S-NSSAI then the UE includes all S-NSSAI in the AN signaling message.

(2) The RAN node rejects the AN signaling connection establishment when it receives an AN signaling message containing a S-NSSAI or list of S-NSSAIs for which the RAN has received a N2 message instructing the RAN node to reject a AN signaling connection establishment.

0. A UE is registered to a PLMN and is in idle state has no signaling connection.

1. The (R)AN node receives a N2 message (S-NSSAI(s), wait time (Optional)) (e.g. NGAP OVERLOAD START) containing a list of S-NSSAI of the congested network slice and optionally a wait timer for each S-NSSAI in the list from AMF. The N2 message is requesting the (R)AN node to start overload control related to the list of S-NSSAI sent in the N2-message as per the procedure defined in sub clause 5.19.5.2 of Non patent literature 1. The wait time included for each S-NSSAI indicates the period after which the network may not experience network slice related congestion.

2. The UE gets trigger to initiate service request procedure. For example due to trigger to establish a PDU session or trigger to initiate user plane connection for an established PDU session.

3. The UE initiates AN Signaling connection establishment procedure and sends a first AN signaling message containing S-NSSAI of the PDU session to be established. The first AN signaling connection is a first AN signaling message (RRC Connection Request message) sent by the UE to the (R)AN during AN Signaling connection establishment procedure or a second AN signaling message (RRC Connection setup complete) sent by a UE to (R)AN node after the UE receives a AN signaling message from the (R)AN in response of first AN message of the UE during AN signaling connection establishment.

4. The RAN node receives the first AN signaling connection Request message containing S-NSSAI and establishment cause. The (R)AN node rejects AN signalling connection establishment procedure when a S-NSSAI present in the AN signalling message is indicated in the first N2 signalling message as congested. The (R)AN node sends a second AN signalling message containing (S-NSSAI and wait time, AN cause (optional)).

In one scenario in above case of step 4, the (R)AN node provides an additional information in a first information element (e.g. AN cause or RRC cause) indicating the reason for failure in establishing the AN signaling connection together with list of S-NSSAI and wait time in the second AN signaling message. The information element contains a value congestion if RAN detects general NAS level congestion or network slice congestion if RAN detects congestion in the network slice(s).

In case the AN signaling connection establishment is rejected due to NAS level congestion then the AN node set the information element with value congestion and includes wait time in the first AN message and does not include list of S-NSSAI and their wait time. In one case it just includes wait time in the second AN signaling connection and does not include list of S-NSSAI and their wait time and the first information element.

In one scenario in the above case the wait time sent for each S-NSSAI to the UE is same as the wait time provided by the AMF for this S-NSSAI.

In one scenario in the above case the wait time sent for each S-NSSAI to the UE is derived by the (R)AN node by considering the wait time received from the AN node for this S-NSSAI as one input parameter in deriving the wait time.

In one scenario when the wait time is not received from the AMF then the (R)AN decides wait time for each S-NSSAI by itself or on some other parameters provided by AMF in the N2 message.

5. The UE receives the second AN signaling message. The UE releases the AN signaling connection if the AN signaling connection was established or abort the AN signaling connection when AN signaling connection establishment was initiated.

6. The UE optionally sends the third AN signaling message (e.g. RRC connection Release complete if the second AN signaling message was RRC Connection Release Request) acknowledging the second AN signaling message and indicating the successful release of the AN signaling connection when the AN connection was established successfully.

7. If the second AN signaling message contains the information element set to network slice congestion or congestion, and contains the list of S-NSSAI and wait time for each S-NSSAI then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the second AN signaling message contains the list of S-NSSAI and wait time for each S-NSSAI and does not contain the first information element then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the second AN signaling message contains wait time and does not contain the list of S-NSSAI and their wait time, and the first Information element, then the UE does not initiates any NAS or AS procedure i.e. the UE does not send any AS or NAS signaling message to the network. The UE does not establish any AS or NAS signaling connection.

If the second AN signaling message contains the information element which value is set to congestion, and wait time but does not contain list of S-NSSAI and then the UE does not initiates any NAS or AS procedure i.e. the UE does not send any AS or NAS signaling message to the network. The UE does not establish any AS or NAS signaling connection.

Figure 6:
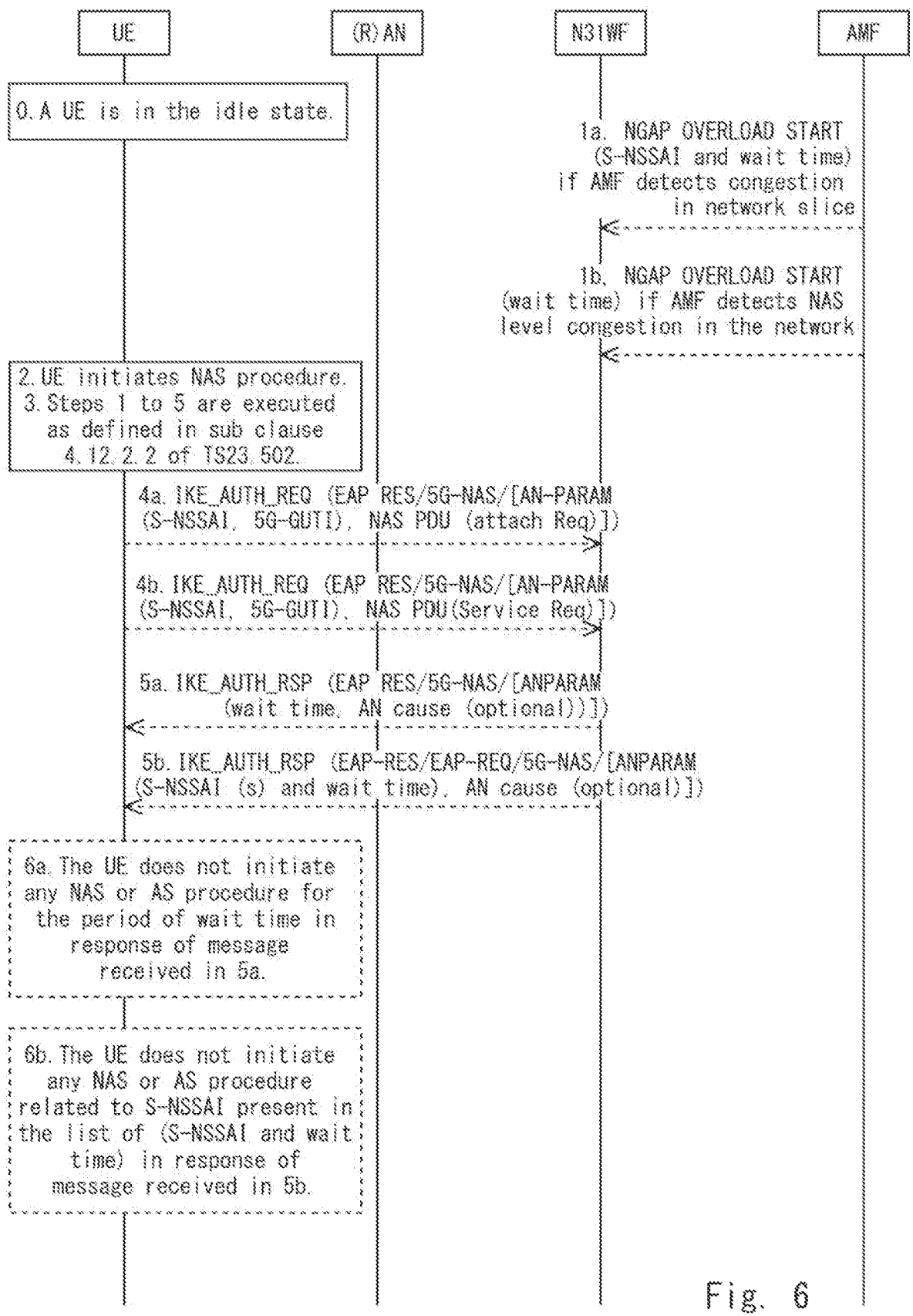
FIG. 6 is a procedure to handle congestion control by N3IWF.

The FIG. 6 shows a procedure to handle congestion control by N3IWF. This procedure discloses the following technical aspects to the overload control in the 5GS.

(1) When a N3IWF receives EAP message for 5G and containing a list of S-NSSAI and the N3IWF has received a N2 message (e.g. NGAP OVERLOAD START) to reject the AN connection establishment for the S-NSSAI present in the list of S-NSSAI then the N3IWF sends an EAP message for 5G containing the list of S-NSSAI and wait time for each S-NSSAI present in the S-NSSAI list. When the N3IWF receives a N2 message (e.g. NGAP OVERLOAD START) indicating NAS level congestion control then the N3IWF rejects the AN signaling connection establishment procedure and send a wait time.

(2) When a UE receives a wait time in EAP response then the UE does not initiate any NAS procedure i.e. does not send any NAS or AS message related till the time period of the wait time. When a UE receives a list of S-NSSAI and wait time for each S-NSSAI in the EAP message then the UE does not initiate any NAS or AS procedure related to S-NSSAI present in the list for the duration of wait time of the S-NSSAI.

0. The UE is in the idle.
1. Either step 1a or 1b takes place.

If an AMF detects NAS level congestion control then it sends N2 message (e.g NGAP OVERLOAD START message) containing (wait time) requesting the N3IWF to perform overload control as per the sub clause 5.19.5.2 of Non patent literature 1. If the AMF detects slice related network congestion then it will send an N2 message containing a list of S-NSSAI of the network slices which are congested and requesting the UE to perform AN overload control as per the sub clause 5.19.5.2 of Non patent literature 1. The network also includes wait time for each S-NSSAI in the list.

2. The UE is in the idle.
3. The UE initiates NAS procedure (Registration procedure related to initial attach or mobility, or Service Request procedure). The UE executes steps 1 to 5 are executed as defined in sub clause 4.12.2.2 of TS 23.502 for registration procedure or service request procedure.
4. Either step 4a or 4b takes place.

The UE sends service request in IKEAUTH_REQ message as mentioned in step 4b in the above figure and registration request in IKE_AUTH_REQ message as mentioned in step 4a in the FIG. 6.

Step 4a may contains a parameter that indicates that this message is for the attach request or registration request as the IKE parameter or as the EAP parameter. Step 4b may contains a parameter that indicates that this message is for the service request as the IKE parameter or as the EAP parameter. Step 4b may contains an S-NSSAI parameter that indicates that an S-NSSAI that UE wishes to establish the PDU connection in the IKE parameter or in the EAP parameter.

5. Either step 5a or 5b takes place.

The N3IWF sends an IKE message containing a wait time and an optional information element AN cause which is set to a value (e.g. congestion) related to NAS congestion when it receives a N2 message in step 1a to perform NAS level congestion controller The N3IWF sends an IKE message containing a list of S-NSSAI which present in the step 4a or 4b and indicated as congested in the first N2 message in step 1a. The IKE message also contains wait time for each S-NSSAI in present in the list. The IKE message optionally contains an information element indicating network slice related congestion.

The message is step 5 is as defined as follows:
IKE_AUTH_RSP(EAP-RES/5G-NAS/[AN-PARAM (S-NSSAI (s) and wait time), AN cause (optional))
IKE_AUTH_RSP(EAP-REQ/5G-NAS/[AN-PARAM (S-NSSAI (s) and wait time), AN cause (optional))
IKE_AUTH_REQ(EAP-RES/5G-NAS/[AN-PARAM (S-NSSAI (s) and wait time), AN cause (optional))
IKE_AUTH_REQ(EAP-REQ/5G-NAS/[AN-PARAM (S-NSSAI (s) and wait time), AN cause (optional))
IKE_AUTH_RSP(EAP-RES/5G-NAS/[AN-PARAM (wait time), AN cause (optional))
IKE_AUTH_RSP(EAP-REQ/5G-NAS/[AN-PARAM (wait time), AN cause (optional))
IKE_AUTH_REQ(EAP-RES/5G-NAS/[AN-PARAM (wait time), AN cause (optional))
IKE_AUTH_REQ(EAP-REQ/5G-NAS/[AN-PARAM (wait time), AN cause (optional))

6. Either step 6a or 6b takes place in accordance with step 5.

If the IKE message in step 5 contains the information element set to network slice congestion or congestion, and contains the list of S-NSSAI and wait time for each S-NSSAI then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the IKE AN message is step 5 contains the list of S-NSSAI and wait time for each S-NSSAI and does not contain the first information element then the UE does not initiate any NAS or AS procedure related to the S-NSSAI present in the list for the period of corresponding wait time i.e. the UE does not send any NAS or AS signaling related to the S-NSSAI present in the S-NSSAI present in the list for the period of corresponding wait time. The UE initiates NAS procedure or AS procedure related to a S-NSSAI not present in the list of S-NSSAI received from the (R)AN node i.e. the UE sends NAS or AS message related to a S-NSSAI not present in the list of S-NSSAI received from the (R)AN node.

If the IKE message in step 5 contains wait time and does not contain the list of S-NSSAI and their wait time, and the first Information element, then the UE does not initiates any NAS or AS procedure i.e. the UE does not send any AS or NAS signaling message to the network. The UE does not establish any AS or NAS signaling connection.

If the IKE message in step 5 contains the information element which value is set to congestion, and wait time but does not contain list of S-NSSAI and then the UE does not initiates any NAS or AS procedure i.e. the UE does not send any AS or NAS signaling message to the network. The UE does not establish any AS or NAS signaling connection.

User Equipment (UE)

Figure 7:
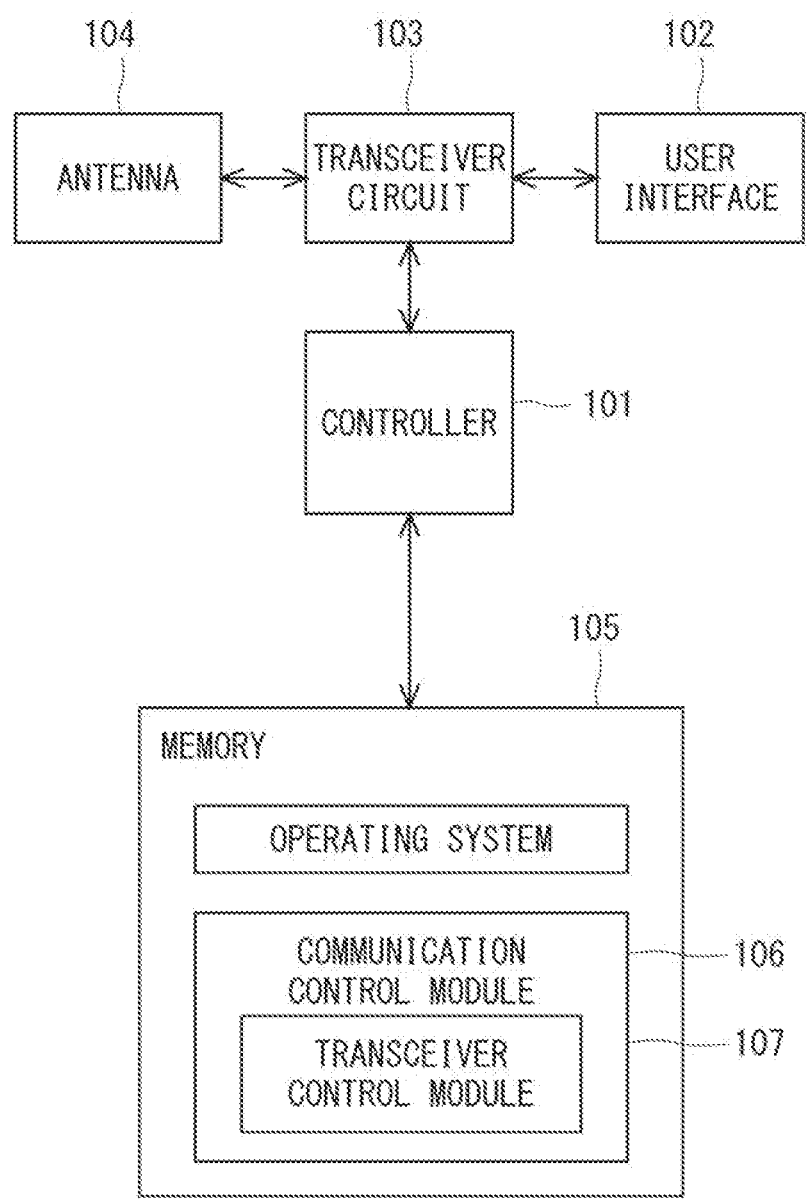
FIG. 7 is a block diagram illustrating the main components of the UE.

FIG. 7 is a block diagram illustrating the main components of the UE. As shown, the UE (100) includes a transceiver circuit (103) which is operable to transmit signals to and to receive signals from the connected node(s) via one or more antenna (104). Although not necessarily shown in FIG. 7, the UE will of course have all the usual functionality of a conventional mobile device (such as a user interface (102)) and this may be provided by any one or any combination of hardware, software and firmware, as appropriate. Software may be pre-installed in the memory and/or may be downloaded via the telecommunication network or from a removable data storage device (RMD), for example.

A controller (101) controls the operation of the UE in accordance with software stored in a memory (105). The software includes, among other things, an operating system and a communications control module (106) having at least a transceiver control module (107). The communications control module (106) (using its transceiver control sub-module) is responsible for handling (generating/sending/receiving) signalling and uplink/downlink data packets between the UE and other nodes, such as the base station/(R)AN node, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update, RAN notification area (RNA) update) etc.

(R)AN Node

Figure 8:
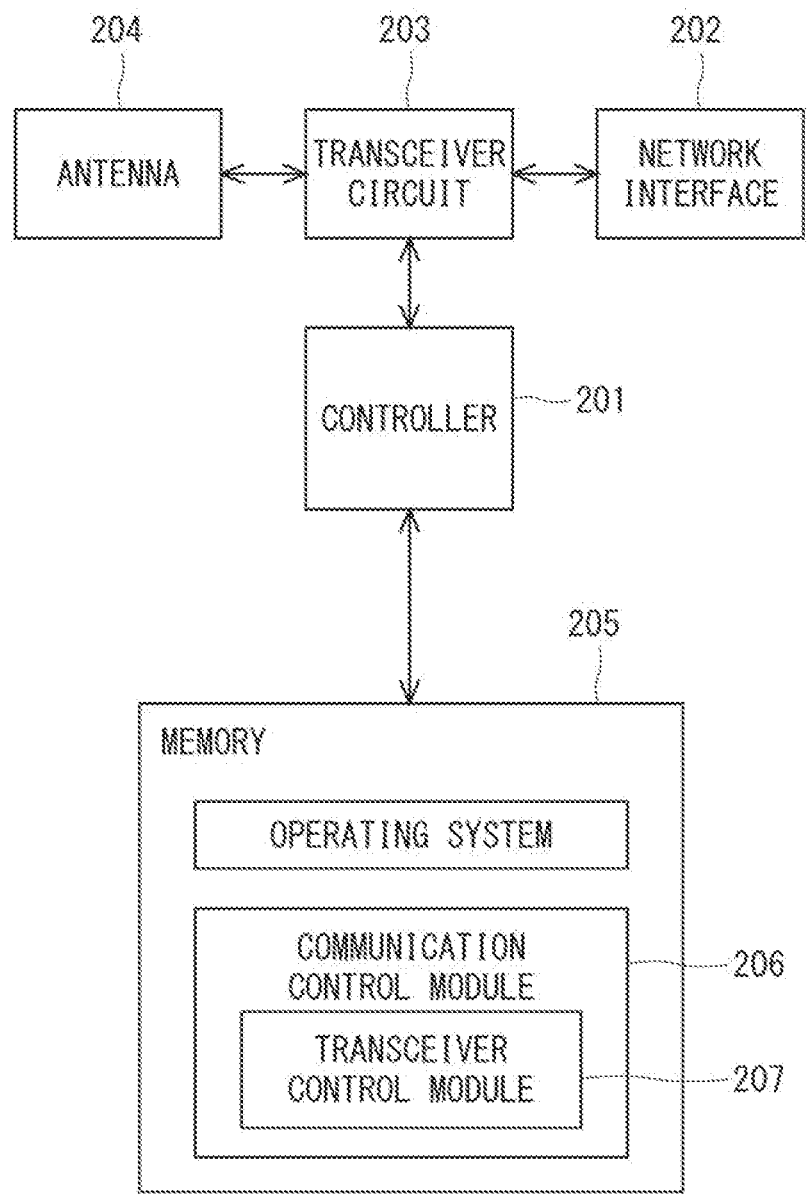
FIG. 8 is a block diagram illustrating the main components of an exemplary (R)AN node.

FIG. 8 is a block diagram illustrating the main components of an exemplary (R)AN node (200), for example a base station ('gNB' in 5G). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface (202). A controller (201) controls the operation of the (R)AN node in accordance with software stored in a memory (205). Software may be pre-installed in the memory and/or may be downloaded via the telecommunication network or from a removable data storage device (RMD), for example. The software includes, among other things, an operating system and a communications control module (206) having at least a transceiver control module.

The communications control module (206) (using its transceiver control sub-module) is responsible for handling (generating/sending/receiving) signalling between the (R)AN node and other nodes, such as the UE, the AMF, and the UDM/UDR (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update, RAN notification area (RNA) update), N2 messaging (e.g. to activate an N2 connection, to convey an NAS message from the UE, to provide any RRC Inactive state feature capability support information to the AMF, and related N2 request/response messages from the core network), etc.

The controller is also configured (by software or hardware) to handle related tasks such as, when implemented, RRC Inactive state optimisation, UE mobility estimate and/or moving trajectory estimation.

AMF

Figure 9:
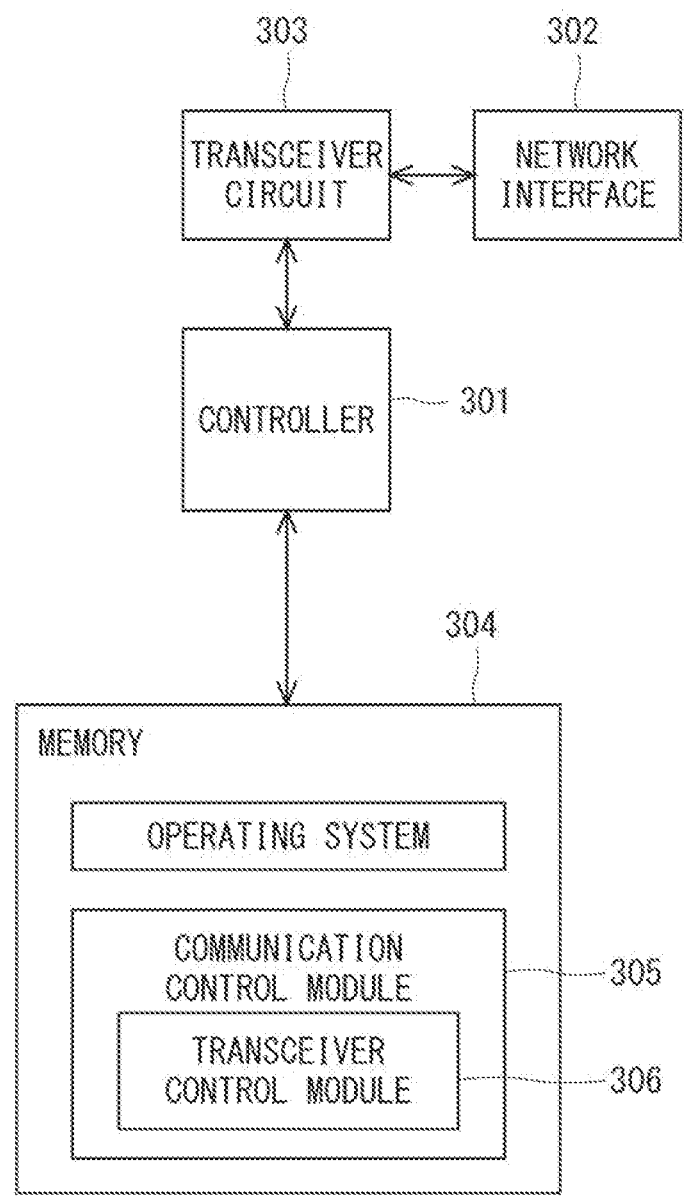
FIG. 9 is a block diagram illustrating the main components of the AMF.
Figure 10:
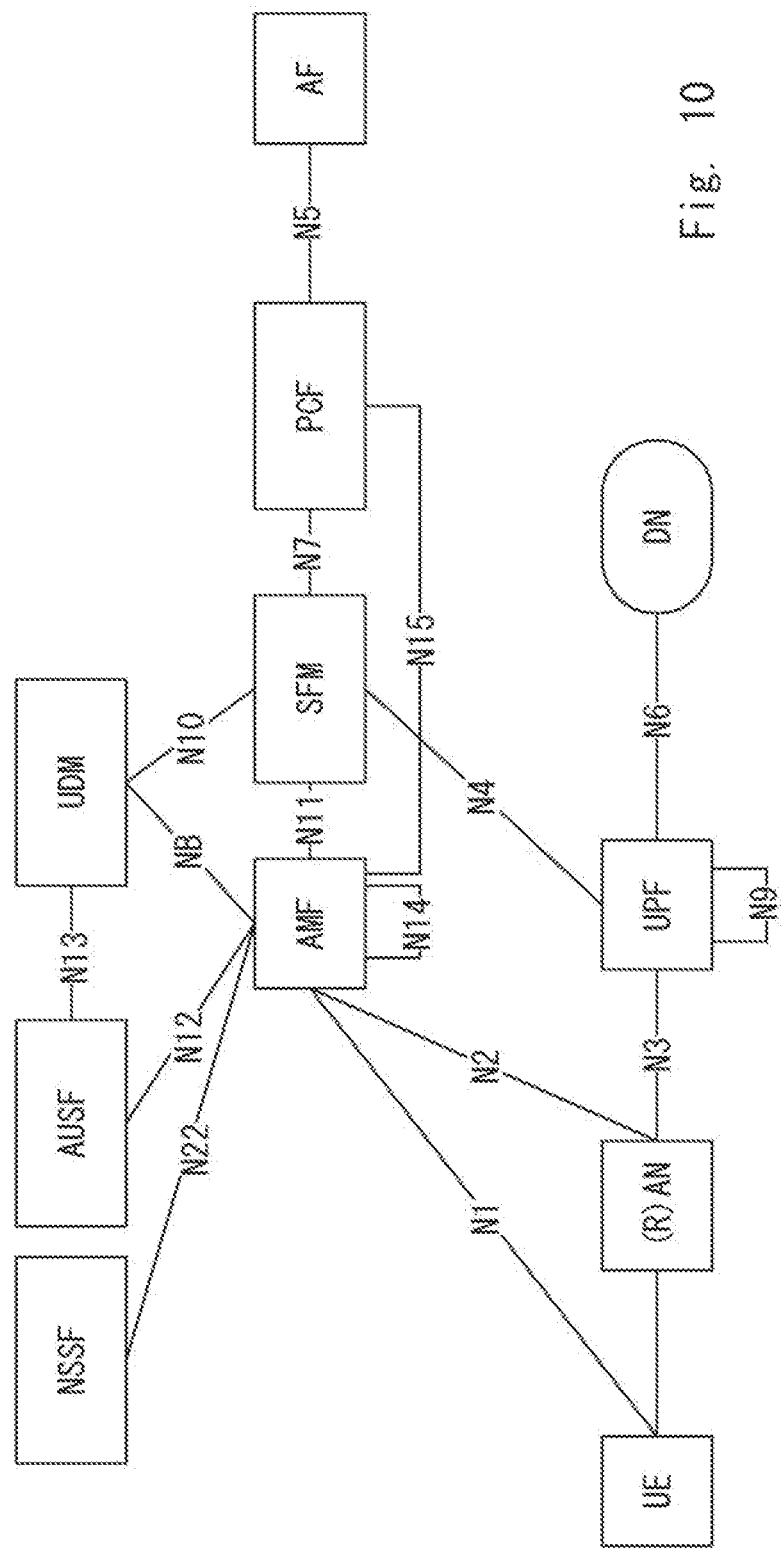
FIG. 10 is 5G System Architecture.

FIG. 9 is a block diagram illustrating the main components of the AMF (300). As shown, the AMF (300) includes a transceiver circuit (303) which is operable to transmit signals to and to receive signals from other nodes (including the UE) via a network interface (302). A controller (301) controls the operation of the AMF (300) in accordance with software stored in a memory (304). Software may be pre-installed in the memory (304) and/or may be downloaded via the telecommunication network or from a removable data storage device (RMD), for example. The software includes, among other things, an operating system and a communications control module (305) having at least a transceiver control module.

The communications control module (using its transceiver control sub-module) is responsible for handling (generating/sending/receiving) signalling between the AMF and other nodes, such as the UE, base station/(R)AN node, and UDM/UDR (directly or indirectly). Such signalling may include, for example, appropriately formatted signalling messages relating to the procedures described herein, for example, N2 messaging (e.g. from the (R)AN to activate an N2 connection, to convey an NAS message from the UE, and to provide any RRC Inactive state feature capability support information to the AM, and related N2 request/response messages to the (R)AN to provide, if implemented, (further) RRC Inactive assistance information), signalling messages relating to UE subscription enquiries, etc.

Another Embodiment

AS (Access Stratum) may include an RRC layer, a SADP layer, a PDCP layer, a RLC layer, a MAC layer and PHY layer.

NG-RAN may include an eNB (evolved Node B) connected with 5GC and gNB.

The "wait time" as mentioned above may be denoted as "wait timer".

The "AN signaling message" in downlink as mentioned above may be "RRCConnectionReject", "RRCConnectionRelease" or "RRCConnectionReestablishmentReject".

The "AN signaling message" in uplink as mentioned above may be "RRCConnectionRequest", "RRCConnectionReestablishmentRequest", "RRCConnectionResumeComplete", "RRCConnectionResumeRequest" or "RRCConnectionSetupComplete".

This application is based upon and claims the benefit of priority from Indian patent applications No. 201811006021, filed on Feb. 16, 2018, the disclosure of which is incorporated herein in its entirety by reference.

REFERENCE SIGNS LIST

100 UE
101 controller
102 user interface
103 transceiver circuit
104 antenna
105 memory
106 control module
107 transceiver control module
200 (R)AN node
201 controller
202 network interface
203 transceiver circuit
204 antenna
205 memory
206 communications control module
207 transceiver control module
300 AMF
301 controller
302 network interface
303 transceiver circuit
304 memory
305 communications control module
306 transceiver control module

What is claimed is:

1. A User Equipment (UE) comprising:
a memory; and
a processor coupled with the memory,
wherein the processor is configured to:
   send an IKE_AUTHREQ message to a Non-3rd Generation Partnership Project (3GPP) InterWorking Function (N3IWF) node, wherein the IKE_AUTH_REQ message includes one or more Single Network Slicing Selection Assistance Information (S-NSSAIs);
   receive an IKE_AUTH_RSP message from the N3IWF node based on the S-NSSAIs in the IKEAUTHREQ message only including one or more S-NSSAIs indicated in an OVERLOAD START message received by the N3IWF node, wherein the IKE_AUTH_RSP message includes an information element to notify a congestion in a network, and wherein the IKE_AUTH_RSP message further includes a value of a backoff timer; and
   not restart a procedure related to Non-Access Stratum (NAS) by the UE until the backoff timer expires.

2. A method of a User Equipment (UE), the method comprising:
sending an IKE_AUTH_REQ message to a Non-3rd Generation Partnership Project (3GPP) InterWorking Function (N3IWF) node, wherein the IKE_AUTH_REQ message includes one or more Single Network Slicing Selection Assistance Information (S-NSSAIs);
receiving an IKE_AUTH_RSP message from the N3IWF node based on the S-NSSAIs in the IKE_AUTH_REQ message only include including one or more S-NSSAIs indicated in an OVERLOAD START message received by the N3IWF node, wherein the IKE_AUTH_RSP message includes an information element to notify congestion in a network, and wherein the IKE_AUTH_RSP message further includes a value of a backoff timer; and
not restarting a procedure related to Non-Access Stratum (NAS) by the UE until the backoff timer expires.

* * * * *